INVENTORS:
Charles G. Curtis and Earl R. Newton,
By Attorneys,
Gustave R. Thompson Patented June 24, 1930

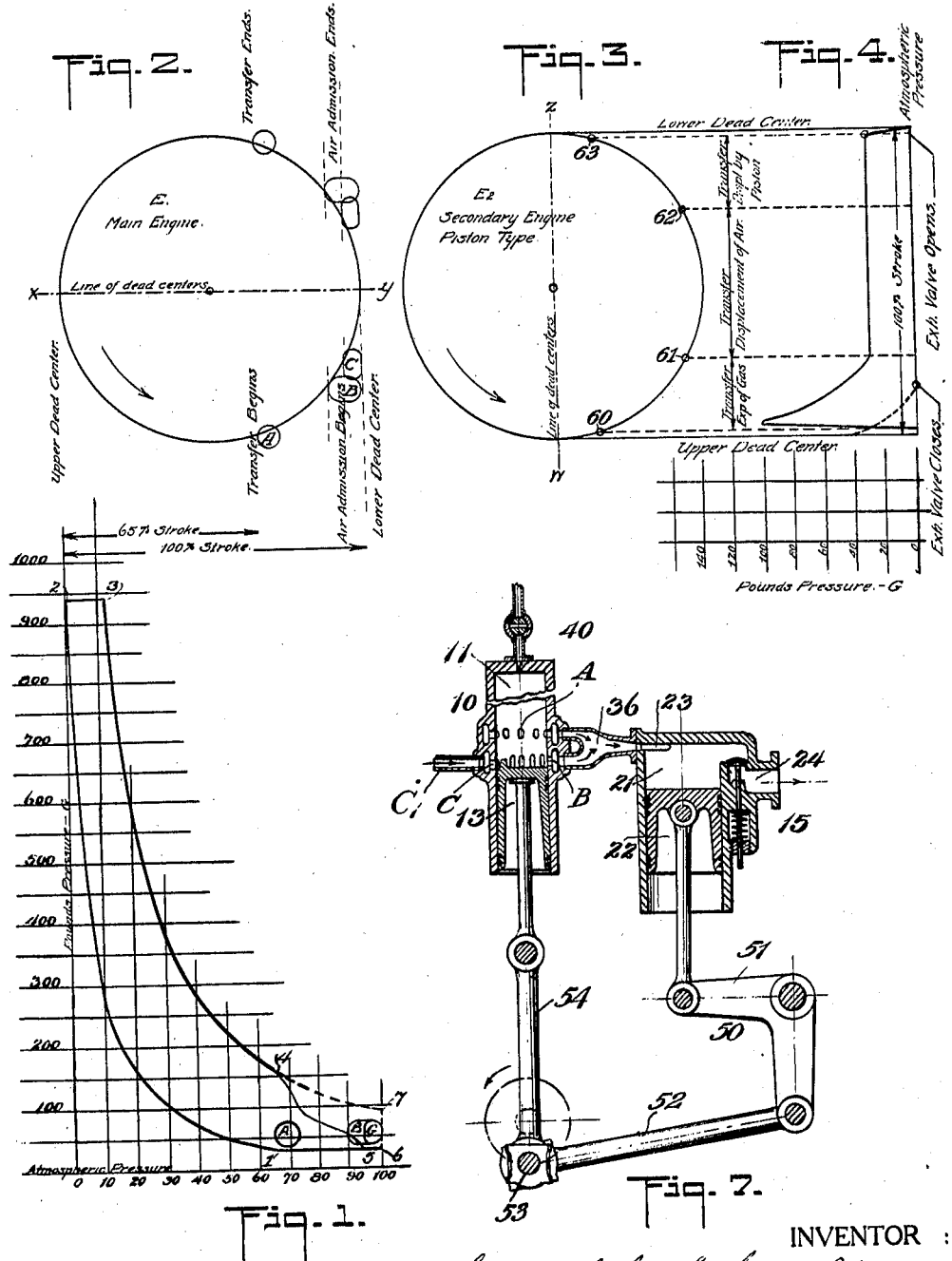

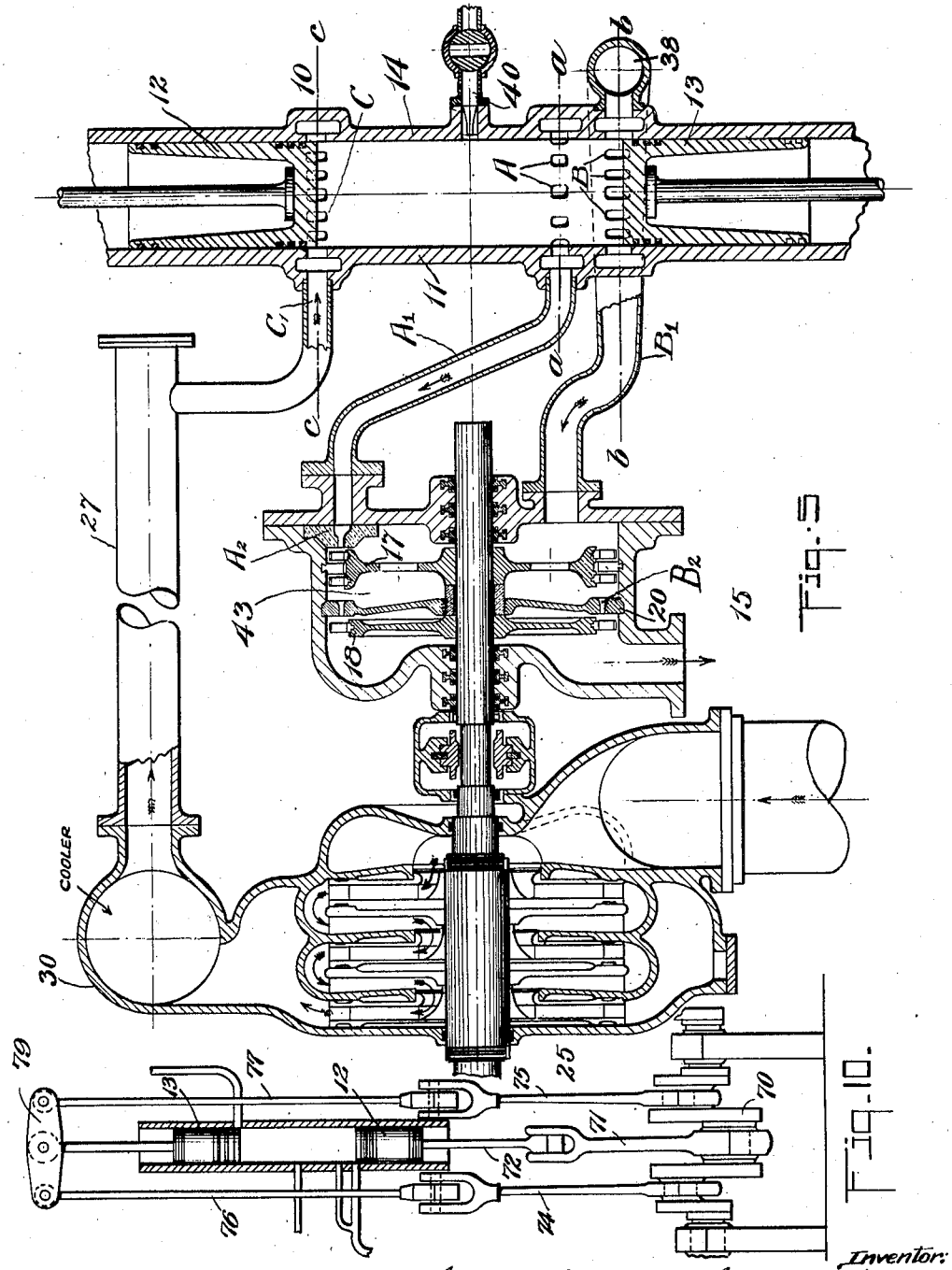

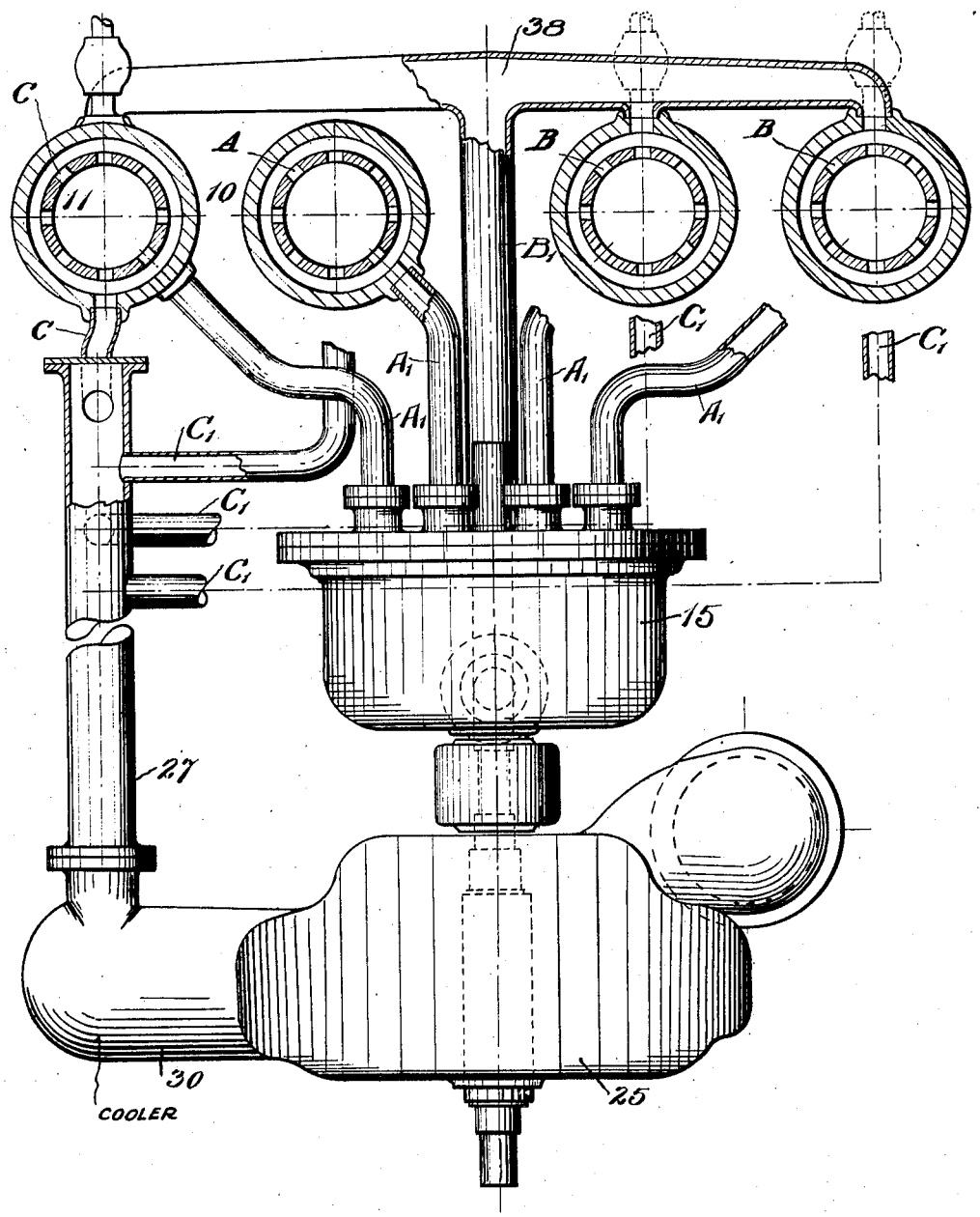

1,765,716

UNITED STATES PATENT OFFICE

CHARLES G. CURTIS AND EARLE R. NEWTON, OF NEW YORK, N. Y., ASSIGNORS TO CURTIS GAS ENGINE CORPORATION, OF NEW YORK, N. Y., A CORPORATION OF NEW YORK

POWER PLANT

Application filed January 24, 1924. Serial No. 688,179.

This invention relates to a power plant comprising a two-stroke cycle reciprocating internal combustion engine of comparatively few expansions, charged by compressed air to a pressure substantially above atmospheric pressure (say, for example, 10 lbs. gauge or higher) and scavenged, in combination with secondary apparatus to which is fed the burned gas released from the cylinders of said engine. A power plant of this character has decided advantages in cost and weight as compared with the usual type of Diesel engines, and it admits of developing a horsepower output far in excess of that obtainable with the usual type of Diesel engine.

This invention provides a highly efficient power plant of the above-mentioned type, operating on a simple practical cycle of operations.

In a preferred embodiment the invention is carried out by releasing partially expanded burned gas from the engine cylinders at a pressure substantially above the scavenging pressure, by dropping the pressure of said gas to said scavenging pressure and utilizing in the secondary apparatus the declining pressure existing while said drop is taking place, by driving out the burned gas remaining in the engine cylinders at this lower pressure by the introduction of precompressed air to the cylinders and by the return movement of the piston up to the point where the exhaust passages close and engine compression begins, by utilizing in the secondary apparatus the approximately constant pressure existing during this clearing-out period, and by using the power developed by the secondary apparatus to compress air required for scavenging and charging the engine cylinders.

Two embodiments of the invention are illustrated in the accompanying drawings. In said drawings,—

Figure 1 shows a theoretical indicator card characteristic of the type of engine herein specifically described;

Fig. 2 is a diagram showing the relative location of ports (inlet and exhaust) and the crank-pin movement;

Figs. 3 and 4 show a diagram and a theoretical card for secondary expansion apparatus of the reciprocating piston engine type;

Fig. 5 is a vertical sectional view of a somewhat diagrammatic character, of one cylinder of the engine in combination with secondary expansion apparatus of the elastic fluid turbine type driving an air compressor;

Fig. 6 is a diagrammatic plan view of the parts shown in Fig. 5; the section through the two cylinders on the left being on the lines c—c and a—a respectively, Fig. 5, and the section through the two cylinders on the right being on the line b—b, Fig. 5.

Fig. 7 is a vertical sectional view of a somewhat diagrammatic character, of one cylinder of the engine in combination with secondary expansion apparatus of the reciprocating piston engine type.

Fig. 10 is a view partly in elevation and partly in vertical section showing the crankshaft connections of the pistons of the double-acting engine shown in Fig. 5.

Figure 8:
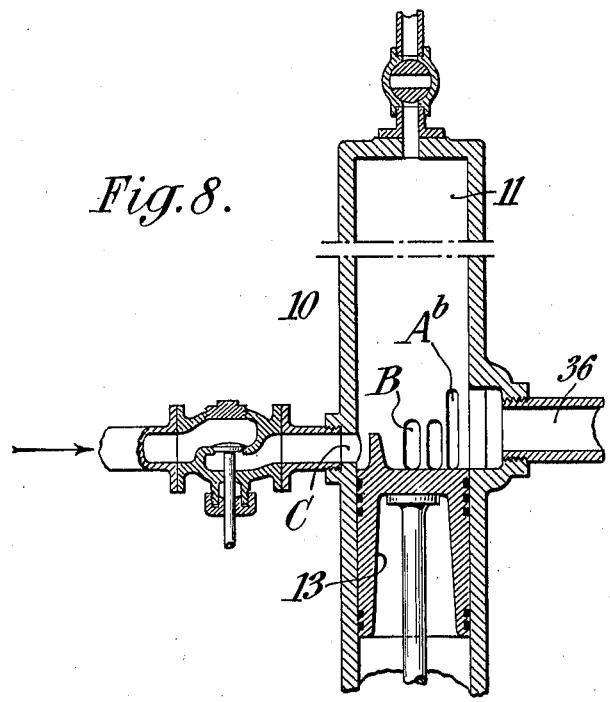
Fig. 8 is a vertical sectional view of the engine cylinder and piston, and illustrates a modification of the port arrangement.

Referring to said drawings, numeral 10 designates an internal combustion engine of the two-stroke cycle reciprocating type. The engine 10 may comprise a cylinder 11 having one or more pistons 12, 13, therein. A and B designate exhaust ports through which the combusted gas is discharged, and C designates inlet ports through which precompressed air is admitted to the cylinder 11. Where double opposed pistons are used, as illustrated in Fig. 5, these may be connected to a drive shaft in suitable manner, for example, as shown in Fig. 10, the piston 12 being connected to a crank-shaft 70 through a pitman rod 71 and connecting rod 72, and the piston 13 being connected to said crank-shaft 70 through a pair of pitman rods 74, 75, a corresponding pair of connecting rods 76, 77, a cross-bar 79, and a connecting rod 80.

Numeral 15 designates a secondary expansion apparatus shown in Fig. 7 as of the piston expander type, and in Figs. 5 and 6 as of the turbine type. In either case the secondary expansion apparatus is adapted to utilize the energy of the gas discharged at a pressure substantially above atmospheric pressure, from said engine 10. The turbine type of secondary expansion apparatus may comprise a turbine of any type; the turbine illustrated and described is of the impulse type having two sets of wheels 17, 18, and two sets of nozzles $A_2 B_2$, as hereinafter more fully explained. The piston expander type of secondary expansion apparatus may comprise a cylinder 21 and a piston 22, as shown in Fig. 7. Numeral 23 designates the admission port to said cylinder 21, and 24 a valve-controlled outlet through which the exhaust gas may be allowed to escape to the atmosphere after having done its work in the cylinder 21.

Numeral 25 designates a means for compressing air, shown in Fig. 5 as an air compressor of the centrifugal type, which may be driven by the secondary expansion apparatus 15, as here shown. This air compressor 25 is adapted to deliver air to the engine 10 through manifold 27 and one or more branch pipes $C_1$ which lead to the inlet ports C in the cylinder or cylinders of the engine. A cooler 30 may be provided between the compressor and engine inlet ports for cooling the air compressed and thereby increasing the density of the air admitted to the cylinder or cylinders of the engine.

Combusted gas is transferred from the engine 10 to the secondary apparatus 15 through one or more conduits. In a secondary apparatus of the turbine type employing more than one set of nozzles, as illustrated in Figs. 5 and 6, a pipe, as the pipes $A_1$, $B_1$, is provided for each set of nozzles. Where the internal combustion engine 10 comprises a plurality of cylinders, the exhaust gas from the several cylinders may be combined in one or more manifolds 38 and transferred to one turbine, as shown in Fig. 6. With a turbine provided with more than one set of nozzles, two for example, that part which exhausts from the engine cylinders by its own further expanion, is preferably transferred separately from each cylinder to the turbine, a plurality of pipes $A_1$ and nozzles $A_2$ being provided for this purpose, as shown in Figs. 5 and 6.

The piston 13 uncovers and covers the exhaust port or ports A, B, and may be the means for opening and closing the passage or passages $A_1$, $B_1$, as shown, and likewise, with double opposed pistons, the opposite piston 12 uncovers and covers the inlet port C and may be the means for opening and closing the passage $C_1$.

While the passages for admitting compressed air for scavenging and charging the engine cylinders, and for releasing exhaust and scavenged products for transfer to the secondary apparatus, are shown and described as being of the piston-controlled port type without valves, nevertheless valve-controlled passages may be substituted, and single exhaust ports may be substituted for the double ports, as illustrated in Fig. 8. The port C is shown as valve controlled, and certain of the ports A—B are combined into a single port, as indicated by letter $A^b$.

Fuel is supplied to the engine 10 in suitable manner, preferably by injection through a nozzle 40 on the Diesel principle.

Cycle of operation: Based on Figs. 1, 2–5 and 6 which illustrate a desirable embodiment of the invention.

Fig. 1 is a theoretical indicator card of the internal combustion engine; engine compression begins at (1) and is complete at (2), fuel is burned (2) to (3), partial engine expansion takes place (3) to (4), at which latter point gas is released and transferred to the turbine 15, Fig. 5, through ports (A) and pipes ($A_1$) and further expansion of the gas takes place simultaneously in the engine cylinder and in the turbine during the period (4) to (5) on the indicator card. When (5) is reached the pressure has been dropped to the scavenging pressure, fresh compressed air is admitted (5) to (6) to (5) through ports C displacing part or all of the gas, which latter is transferred to turbine 15, through both the (A) and (B) ports and the pipes ($A_1$) and ($B_1$), wherein it is expanded to the atmosphere. The piston continues on its return stroke and squeezes out any remaining gas and excess of air (5) to (1) which is also transferred through the (A) and (B) ports and the pipes ($A_1$) and ($B_1$) to the turbine for further expansion, and at (1) the admission and exhaust ports being closed, a fresh charge of air remains in the cylinder at the desired pressure and engine compression again begins, and the cycle repeated. The secondary expansion apparatus (turbine 15) is thus actuated by the gas exhausted from the engine in two successive steps; first by the puff, through the A ports, passages and nozzles, the period of which is shown from (4) to (5) on the indicator card at a declining pressure, and secondly by the gas pushed out or displaced by the incoming fresh compressed air and by the return movement of the piston through both the A and B ports and passages, the period of which is shown from (5) to (6) to (5) to (1) on the indicator card at constant pressure.

Figure 9:
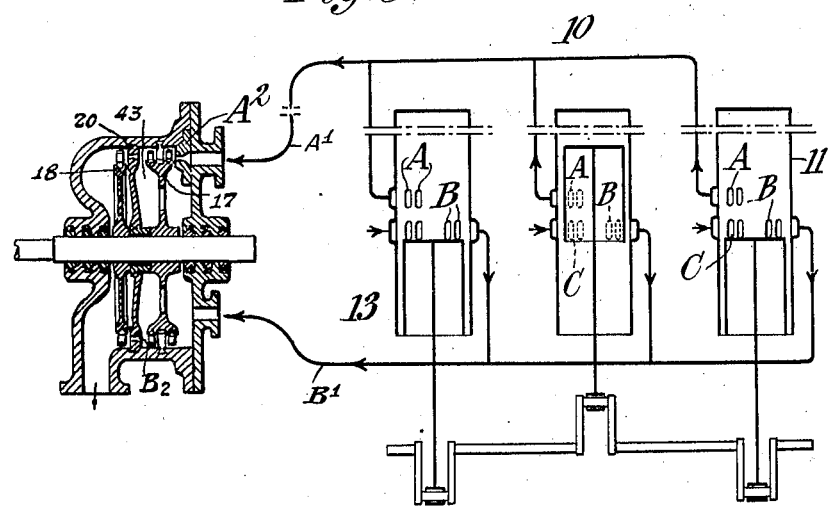
Fig. 9 is a diagrammatic view illustrating certain of the exhaust ports (the A ports) in cylinders whose cranks are space 180° and 360°, connected to a common nozzle of the turbine.

The (A) ports in each cylinder are shown as delivering gas to independent first stage turbine nozzles ($A_2$), one nozzle or set of nozzles for each cylinder, whereas the B ports are shown as delivering gas through a common manifold $B_1$ to a first stage chamber 43 of the turbine 15. It is possible, however, for the A ports of all cylinders whose cranks are 180° or 360° apart to deliver to common nozzles, as illustrated in Fig. 9.

In describing the operation of the apparatus illustrated in Figs. 5 and 6, figures of pressure will be used to serve as a practical example of the application of this invention, but these figures are subject to wide variation, depending on the characteristics of the apparatus best suited to the particular field of its application.

The pistons 12 and 13 are shown just prior to the completion of the expansion stroke. Precompressed air from the manifold 27 (which acts as a receiver) at a pressure of, say, 33 lbs., is being passed through ports (C) into the engine cylinder 11, and gas is being pushed out or displaced by this incoming fresh air through the (A) and (B) ports and passages. A pressure of say 30 lbs. is maintained in the cylinder, and a pressure of say 25 lbs. is maintained in the first stage chamber 43 of the turbine 15. The gas which is delivered to the turbine through the A and B ports unites in chamber 43, expands to atmospheric pressure in nozzles $B_2$, and the velocity thus set up is extracted by the second stage wheel 18 of the turbine 15. This action continues while the pistons are passing through their lower dead center periods, and on the return strokes the inlet ports (C) are first covered and cut off by the piston 12, the exhaust ports (A) being open and the (B) ports partially open. Whatever gas remains in the cylinder is at the exhaust end. The pistons continuing on their return strokes squeeze out any remaining gas and excess air through the (A) ports, and when these ports are covered by piston 13 a charge of fresh air is left in the cylinder at say 30 lbs. pressure. Engine compression then begins and continues to the end of the return strokes. The pressure after this compression reaches, say, 940 lbs. Fuel is injected through nozzle 40, and the pistons start on their expansion strokes.

At the point in the expansion stroke where piston 13 uncovers the (A) ports the pressure is, say, 150 lbs., and gas at this pressure is released and transferred to the first stage turbine nozzles ($A_2$), establishing a pressure of say 110 lbs. at the nozzle. The pressure in chamber 43 being assumed at 25 lbs., a velocity corresponding to this drop in pressure (110 lbs. to 25 lbs.) is set up and is extracted by the first stage turbine wheel 17. The pressure in the cylinder, and hence also at nozzle ($A_2$) then declines, due both to the release of some of the gas and to the further movement of the pistons on the expansion stroke, until a pressure of between 30 and 25 lbs. has been reached in the engine cylinder. Then the inlet ports (C) are again opened and the cycle repeated.

In the form illustrated in Fig. 7, the secondary apparatus 15 is of the piston type and the movements of the pistons 13 and 22 are so arranged that the piston 22 is at or near the end of its return stroke (so as to present a small clearance space in the cylinder 21 when the piston 13 uncovers the port A to release gas from cylinder 11 to cylinder 21), and suitable means 50 for accomplishing this relative movement of the pistons are provided. The means illustrated comprise a bell-crank 51 and a rod 52 connected to the crank 53 which is driven by the connecting rod 54 of piston 13. There is a lag of about 90° of the piston 22 behind the piston 13, and the angular separation of the lines $x$—$y$, Fig. 2, $z$—$w$, Fig. 3, corresponds to this lag. The point 60, Fig. 3, shows the position of the piston 22 at the time the transfer port A, Fig. 2, opens. By reference to the card Fig. 4, it will be noted that there is a sharp rise of pressure in the cylinder 21 immediately following the opening of port A, followed by a decline in pressure while the piston 22 is moving from point 60 to 61 and while the piston 13 is moving from port A to port B. Points 61—62 indicate the positions of the piston 22 while the admission ports C in cylinder 11 are open. The card Fig. 4 shows that the gas passing into the cylinder 21 at this time maintains an approximately constant pressure. While the piston 13 is returning from port B to port A, Fig. 2, and pushing gas out ahead of it, the piston 22 is moving from 62 to 63, Fig. 3, and the card Fig. 4 shows that an approximately constant pressure is maintained in cylinder 21 during this period. The pressures in the cylinder 21 while the piston is passing from 61—63 are substantially above atmospheric pressure. When the piston 22 reaches point 63 the exhaust valve 24 opens, pressure in cylinder 21 dropping rapidly, as shown by the card Fig. 4. The valve 24 remains open during most or all of the return stroke of piston 22.

The invention may receive other embodiments than those herein specifically illustrated and described.

We claim as our invention:

1. A compound power plant comprising a two stroke cycle internal combustion engine having a piston, a cylinder and an exhaust-opening from said cylinder, the gas after combustion in said engine undergoing a partial expansion within the cylinder of said engine, a secondary expansion apparatus to which the said partially expanded gas is transferred and therein expanded to approximately atmospheric pressure, and means for compressing air to provide a supply of precompressed air, an inlet passage arranged to open and to admit said precompressed air to the engine cylinder at approximately constant pressure substantially above atmospheric pressure while the piston of said engine is passing through its lower dead centre period, said air admission being arranged to displace gas in said cylinder at approximately constant scavenging pressure and to drive it over and to supply it to said secondary expansion apparatus through the exhaust opening at approximately constant pressure substantially above atmospheric pressure, said inlet air passage arranged to be closed at or before the time the exhaust opening is closed, said engine having a drive shaft and being arranged to supply power for external purposes from its drive shaft, and further comprising means for releasing gas from said engine cylinder during the latter part of the expansion stroke and substantially before the expansion has reached said scavenging pressure whereby the cylinder pressure is dropped to said scavenging pressure before the end of said expansion stroke.

2. A compound power plant comprising a two cycle internal combustion engine having a piston, a cylinder and an exhaust opening from said cylinder, the gas after combustion in said engine undergoing a partial expansion within the cylinder of said engine, a secondary expansion apparatus to which the said partially expanded gas is transferred and therein expanded to approximately atmospheric pressure, an inlet passage arranged to open and to admit precompressed air to the engine cylinder at approximately constant pressure substantially above atmospheric pressure while the piston of said engine is passing through its lower dead centre period, said air admission being arranged to displace gas in said cylinder at approximately constant scavenging pressure and to drive it over and to supply it to said secondary expansion apparatus at approximately constant pressure substantially above atmospheric pressure, said engine having a drive shaft and being arranged to supply power for external purposes from its drive shaft, and further comprising means for releasing gas from said engine cylinder during the latter part of the expansion stroke and substantially before the expansion has reached said scavenging pressure whereby the cylinder pressure is dropped to said scavenging pressure and scavenging begins before the end of said expansion stroke.

3. A power plant according to claim 2 further including means for absorbing the power of said secondary expansion apparatus in comprssing said precompressed air.

4. A power plant according to claim 2, further characterized by said secondary expansion apparatus being an elastic fluid turbine and said compressing means being a rotary compressor driven by said turbine.

5. A power plant according to claim 2, further including means for utilizing in said secondary apparatus said gas which is released to effect the drop in pressure.

6. A power plant according to claim 2, further including means for utilizing the gas released before scavenging pressure is reached in said secondary apparatus at a declining pressure.

7. A power plant according to claim 2, further characterized by said secondary expansion apparatus being an elastic fluid turbine having at least two points of expansion, means for directing the gas released before scavenging pressure is reached to one point in the expansion of said turbine, and means for directing the gas driven out during the scavenging period to another point in the expansion of said turbine.

8. A two-cycle engine supercharged to a pressure substantially above atmospheric pressure with pre-compressed air comprising a cylinder and means for releasing gas from the cylinder of the engine during the latter part of the expansion stroke and substantially before the scavenging pressure is reached, whereby the pressure within the cylinder drops abruptly to the scavenging pressure and scavenging begins before the end of the expansion stroke; and means for scavenging the cylinder at an approximately constant superatmospheric pressure with precompressed air.

9. A supercharged two-stroke cycle internal combustion engine prime mover, comprising a cylinder in which a partial expansion of the combusted gas takes place, and a piston, said cylinder having an exhaust opening, in combination with secondary expansion apparatus wherein a further expansion of the gas to approximately atmospheric pressure takes place, and a source of precompressed air, means for releasing gas from the cylinder during the latter part of the expansion stroke resulting in a sudden drop in cylinder pressure to the cylinder scavenging pressure before the end of the expansion stroke, an inlet passage adapted to admit said precompressed air to the cylinder, said air admission being arranged to displace gas in said cylinder at a substantially constant cylinder scavenging pressure, and to supply it to said secondary expansion apparatus through an exhaust opening at substantially constant superatmospheric pressure.

In witness whereof, we have hereunto signed our names.

CHARLES G. CURTIS.
EARLE R. NEWTON.